Jan. 6, 1925.

L. O. KOZAR 1,522,132

SYNCHRONIZING APPARATUS

Original Filed May 23, 1921

INVENTOR.

Ladislav O. Kozar

Patented Jan. 6, 1925.

1,522,132

UNITED STATES PATENT OFFICE.

LADISLAV O. KOZAR, OF NEW YORK, N. Y.

SYNCHRONIZING APPARATUS.

Application filed May 23, 1921, Serial No. 472,017. Renewed July 16, 1924.

*To all whom it may concern:*

Be it known that I, LADISLAV O. KOZAR, citizen of the United States, residing at New York, in the county of New York and State of New York, have invented certain new and useful Improvements in Synchronizing Apparatus, of which the following is a specification.

This invention relates to synchronizing apparatus whereby a plurality of independently movable devices or elements may be caused to move at the same rate of speed, the present invention being an improvement on, or addition to, that disclosed in previous patents granted to me on Aug. 26, 1919 under Patent No. 1,314,081, and December 21, 1920 under Patent No. 1,362,876.

The invention is intended more particularly for use in synchronizing a talking machine and a motion picture projection apparatus, and in such apparatus it is sometimes desirable, due to variations in the film or record, to temporarily depart in some degree from the regular synchronizing movement in order to maintain an absolute correspondence of the spoken words with the picture.

It is the object of the present invention to provide a simple device whereby such departure from the regular synchronizing movement can be effected as desired, and to provide also in connection with the same a device giving visible indication of the exact correspondence of record and film.

For further comprehension of the invention, and of the objects and advantages thereof, reference will be had to the following description and accompanying drawings, and to the appended claims in which the various novel features of the invention are more particularly set forth.

Fig. 1 of the drawings is a diagrammatic view of a synchronizing apparatus constructed according to the invention.

Figure 1:
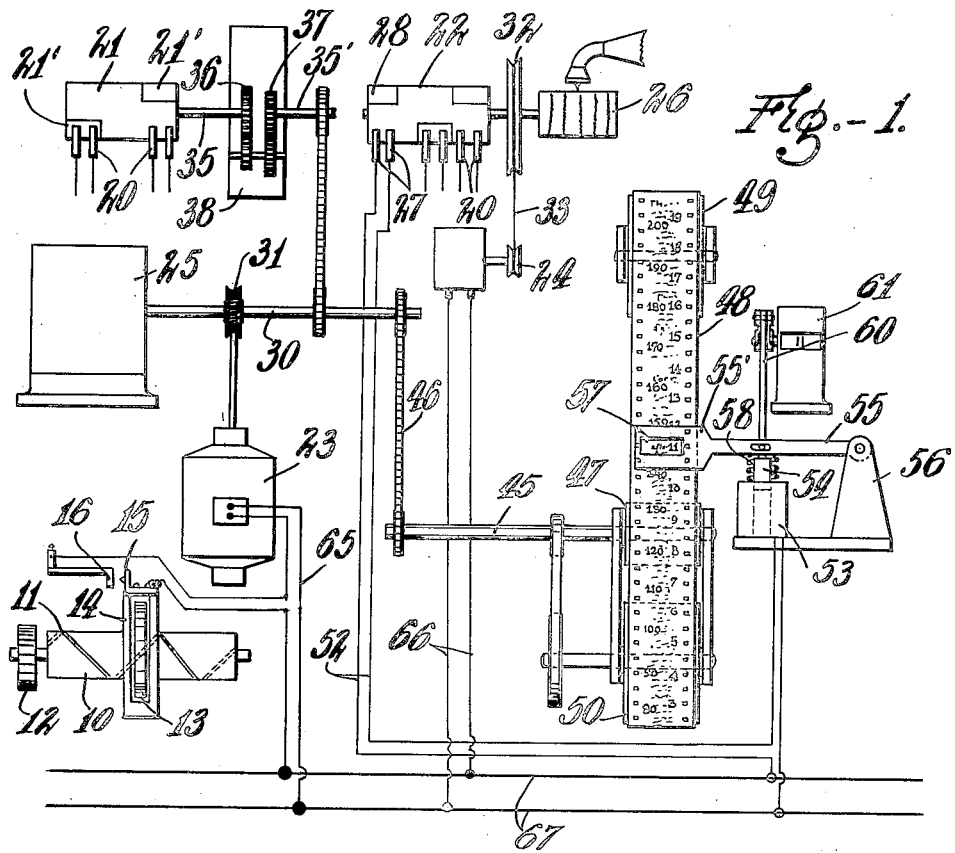
Figures 2, 3:
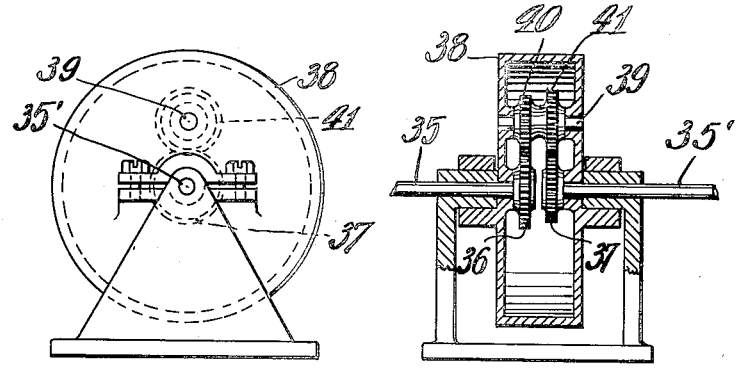
Fig. 2 is a face view of the device for varying the speed of one of the commutators.
Fig. 3 is an axial sectional view thereof.

Referring now to the drawings 10 indicates a drum or cylinder in the surface of which is a cam groove 11. Fixed to the trunnion of this drum is a ratchet wheel 12 while a second ratchet wheel 13 is loose on the drum and has a tooth thereon projecting into the groove 11. Movable with the ratchet wheel 13 is a bracket 14 carrying a contact member 15 adapted to engage a fixed contact member 16 to close the circuit to the motion picture projector. The ratchet wheels 12 and 13 are advanced step by step by pairs of solenoids not necessary to be shown here as the same are fully illustrated in my Patent #1,314,081, the above mentioned parts being all as shown in this patent. Instead of this mechanism I may employ that shown in my Patent 1,362,876 in which the drum is adapted to slide longitudinally.

The energizing of the solenoids is done by brushes 20 engaging contacts on commutators 21 and 22 respectively in a manner pointed out in my previous patent, these commutators being driven by electric motors 23 and 24 which drive the motion picture projector 25 and the sound reproducing machine 26, the commutator 22 having an extra pair of brushes 27 adapted to engage a contact 28 for a purpose to be later set forth.

The drive shaft of the projector 25 is shown at 30 and is driven from the motor 23 by the worm gearing 31. The drive shaft of the talking machine is shown at 32 and is driven by the belt 33 from the motor 24.

In the operation of the device as set forth in my previous patents the contacts 15, 16 are adapted to be opened to stop motor 23 when the commutators are rotating at unequal speeds.

In the present invention I provide means whereby the speed of the commutator 21 may be temporarily varied relatively to the motor 23 when desired. As here shown the shaft 35 of commutator 21 is divided into two sections 35 and 35', and relatively large and small gears 36 and 37 are fixed on adjacent ends of these sections. Pivoted concentrically to the shaft 35 is a circular box 38 in which is journaled a stub shaft 39 on which are fixed a pair of unequal size gears 40 and 41 meshing with the gears 36 and 37. As will be apparent, if a rotary movement be imparted to the gear box 38, the shaft 35 will have a different relative speed of rotation during this rotary movement than it has when the gear box is stationary.

In order to enable the operator to readily determine when the gear box 38 needs rotation I provide the following means: A shaft 45 is driven by a sprocket chain 46 from the projector shaft 30 and has fixed thereon a sprocket wheel 47 of the type used in advancing motion picture film. This sprocket wheel 47 advances a ribbon 48 which may be of celluloid and fed in a well known manner from the feed roller 49 and on to the take up roller 50. Since this ribbon 48 is advanced by the projector drive it follows that any given point on the ribbon will correspond to a selected point on the film, this fact being made use of to enable the position of the sound record relatively to the film to be accurately determined.

The extra pair of brushes 27 are wired as at 52 to a solenoid 53 the core 54 whereof, when energized, acts to pull down an arm 55 pivoted at one end as at 56 and having its opposite end widened as at 55' to form a plate in which is a sight aperture 57. This plate projects across the ribbon which has stamped or otherwise placed thereon two series of numbers arranged in regular rotation along the film, and which are visible in turn through the aperture. The series of numbers on the left side of the ribbon representing the position of the film in the projector, the numbers representing feet or other lineal division of the film, while those on the right side have reference to the number of turns made by the talking machine record. The words of the talking machine record are also preferably written down the ribbon in position to correspond to the movement of the record. A coiled expansion spring 58 normally urges the arm 55 upward. Extending upwardly from the core of the solenoid is a rod 60 whose upper end is suitably connected to the operating arm of a counting machine 61 of any well known construction.

In the operation of the apparatus the solenoid 53 is energized every time the commutator 22 makes a revolution, advancing the counting machine indicator one number. The ribbon 48 is advanced by the projector drive and the numbers thereon are so arranged that when the picture film and sound record are in perfect accord the sight aperture 57 will register, when arm 55 is pulled down, the same number on the ribbon as that shown by the counting machine. If the accord is not perfect the box 38 may be rotated so as to vary the speed of the other commutator 21 and cause ratchet wheel 13 to move along the cylinder 10.

The wiring for the motor 23 is indicated generally at 65 and includes the contacts 15, 16 while the wiring for the motor 24 is indicated at 66, a pair of main leads being shown at 67.

Having thus described my invention what I claim as new and desire to protect by Letters Patent of the United States is as follows:

1. In an apparatus of the type described a drive mechanism, a ribbon adapted to be advanced by the drive mechanism, a second mechanism, a solenoid, a numbering machine adapted for operation by said solenoid, and means for energizing said solenoid in synchronism with the said second mechanism, and an arm adapted to be operated by said solenoid and having a sight aperture adapted to register with numbers marked on the said ribbon.

2. In an apparatus of the type described a drive mechanism, a ribbon adapted to be advanced by the drive mechanism, a second mechanism, a solenoid, a numbering machine adapted for operation by said solenoid, and means for energizing said solenoid in synchronism with the said second mechanism, and an arm adapted to be operated by said solenoid and having a sight aperture adapted to register with numbers marked on the said ribbon, said ribbon having two series of numbers arranged thereon one of said series corresponding to the operation of the talking machine, and the other series corresponding with the advancement of the first drive mechanism.

3. In an apparatus of the type described a projector, a ribbon adapted to be advanced by the projector drive mechanism, a talking machine, a solenoid, a numbering machine adapted for operation by said solenoid, and means for energizing said solenoid in synchronism with the talking machine mechanism, and an arm adapted to be operated by said solenoid and having a sight aperture adapted to register with numbers marked on the said ribbon, said ribbon having two series of numbers arranged thereon one of said series corresponding to the operation of the talking machine, and the other series corresponding with the advancement of the film, said ribbon also having the words of the talking machine record printed thereon and positioned in correspondence to the location on the said record.

L. O. KOZAR.